United States Patent Office 3,492,314
Patented Jan. 27, 1970

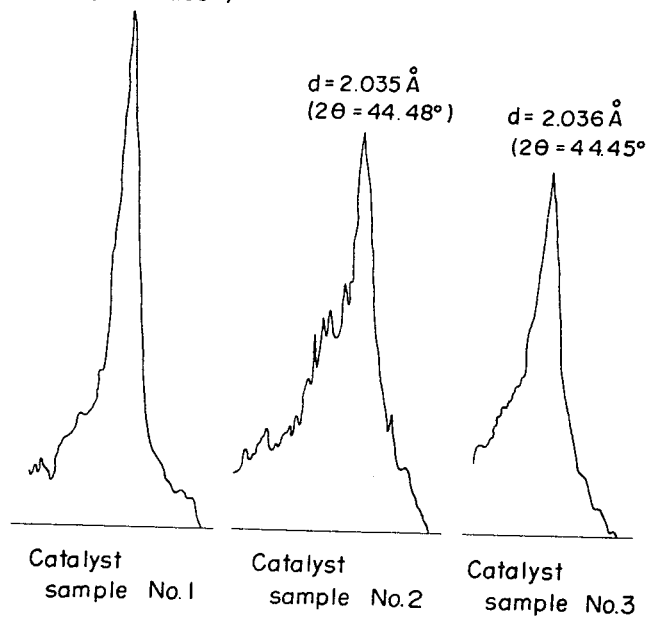

3,492,314
PROCESS FOR CATALYTIC HYDROGENATION OF DICARBOXYLIC ACID ANHYDRIDE AND CATALYST THEREFOR
Taisuke Asano, Junichi Kanetaka, Kenzo Miyake, and Hiroshi Sugiura, Kawasaki-shi, Kanagawa-ken, Japan, assignors to Mitsubishi Petrochemical Co., Ltd., Tokyo, Japan
Filed Aug. 16, 1966, Ser. No. 572,799
Claims priority, application Japan, Aug. 23, 1965, 40/51,033, 40/51,034; Sept. 3, 1965, 40/53,964; Apr. 5, 1966, 41/21,339
Int. Cl. C07d 5/02, 5/06; B01i 11/22
U.S. Cl. 260—343.6                                10 Claims

ABSTRACT OF THE DISCLOSURE

Tetrahydrofuran and $\gamma$-butyrolactone are produced in good yields and high purity by a two-stage hydrogenation of maleic anhydride in the presence of a nickel-rhenium catalyst or from succinic anhydride in a single-stage hydrogenation in the presence of a nickel-rhenium catalyst. The nickel-rhenium catalyst has a long life and is more active than nickel alone.

---

This invention relates to a process for producing hydrogenated products of dicarboxylic acid anhydride such as maleic or succinic anhydride, mainly $\gamma$-butyrolactone and tetrahydrofuran, by subjecting maleic or succinic anhydride to a catalytic hydrogenation in the presence of a nickel catalyst or a catalyst composition comprising nickel and rhenium.

The catalytic hydrogenations of maleic anhydride mentioned above have been disclosed in literature such as specifications of U.S. Patent Nos. 2,772,291, 2,772,292, 2,772,293; Japanese patent publication No. 4461/64; and specification of British Patent No. 931,685.

In the processes described in specification of these U.S. Patents as mentioned above, the catalytic hydrogenation of maleic anhydride is effected in the presence of catalyst systems consisting of nickel-molybdenum oxide, cobalt-molybdenum oxide, Raney-cobalt, Raney-nickel and nickel-chromium oxide-molybdenum oxide and these processes are directed particularly to the production of tetrahydrofuran. It can be noted from these literatures that the reactions in these processes mentioned above require a high reaction pressure or a large amount of catalyst for the satisfactory result.

The process described in the above-mentioned Japanese patent publication No. 4461/63 and British Patent No. 931,685 are both directed to the production of $\gamma$-butyrolactone by the hydrogenation of maleic anhydride.

Although these processes are fairly effective, there is still a considerable room for further improvement before practising these processes on an industrial scale.

An object of this invention is, therefore, to provide a process for the production of $\gamma$-butyrolactone and tetrahydrofuran in a high efficiency by the hydrogenation of maleic or succinic anhydride, and catalysts used therefor.

As a result of our study of the mechanism of the catalytic hydrogenation of maleic and succinic anhydrides, we have found out that maleic anhydride is converted to a pitch-like material at high temperatures even under an elevated hydrogen pressure; that, at low temperatures, water formed during the reaction reacts with succinic anhydride to produce succinic acid which is not susceptible to the catalytic hydrogenation in the presence of a nickel catalyst; that succinic anhydride is not converted to succinic acid at high temperatures; and further that succinic anhydride is not converted to a pitch-like material at high temperatures, unlike maleic anhydride which is a precursor of succinic anhydride.

In accordance with one aspect of this invention, there is provided a process for the production of hydrogenated products of maleic anhydride, mainly $\gamma$-butyrolactone, in a high yield, which comprises subjecting maleic anhydride to a catalytic hydrogenation reaction in a short period of time at relatively low temperatures, and subjecting the reaction product further to another catalytic hydrogenation reaction at relatively high temperatures in the presence of a nickel catalyst.

That is to say, the process for the production of $\gamma$-butyrolactone of this invention comprises a first stage of subjecting maleic anhydride to a catalytic hydrogenation under reaction conditions including a temperature of 30°–150° C., a pressure of 30–100 kg./cm.$^2$, and a reaction period of half an hour to one hour; and a second stage of subjecting the reaction product of the first stage to a further catalytic hydrogenation under reaction conditions including a temperature of 240°–350° C., a pressure of 100–300 kg./cm.$^2$ and a reaction period of 2 to 10 hours in the presence of nickel catalyst.

In the process of this invention as described above, it is presumed that maleic anhydride is converted mainly to succinic anhydride by the mild catalytic hydrogenation of the first stage, which is then converted to $\gamma$-butyrolactone by the catalytic hydrogenation of the second stage. It is further presumed that in the latter stage, the reaction product of the preceding stage is sufficiently hydrogenated to give $\gamma$-butyrolactone in a good yield due to the fact that the reaction temperature employed therein is too high for water formed during the reaction to react with succinic anhydride to form succinic acid, and that maleic anhydride which tends to form a pitch-like material in a catalytic hydrogenation at high temperature has already been converted to succinic anhydride substantially completely in the preceding first stage, i.e., maleic anhydride does not exist in the second stage.

The nickel catalysts which may be used in the catalytic hydrogenation of this invention include, for example, simple or pure nickel such as Raney-nickel; nickel supported on a carrier such as kieselguhr, alumina, pumice and the like; and nickel alloys consisting of a major portion of nickel such as nickel-chromium alloy, nickel-zinc alloy and the like. Any of these nickel catalysts as exemplified above may be conveniently used in the process of this invention in a suitable condition to maintain a sufficient contact with the reactant regardless of the method of preparation thereof and the use of a carrier. Further, the catalysts stabilized by treatment in nitrogen enriched air, carbon dioxide and the like at room temperature or an elevated temperature are resistant to a corrosion by propionic acid, butyric acid and the like which are produced by a side reaction, and they are particularly preferred.

These stabilized nickel catalysts are presumed to have somewhat oxidized surfaces or to have absorbed oxygen, carbon dioxide and the like.

The amount of nickel catalyst used in the process of this invention is not critical, however, in general, an amount of from about 5% to about 10% is preferable based on the weight of maleic anhydride employed.

In practising the catalytic hydrogenation reaction of the first stage of the process of this invention, it is necessary to select the reaction conditions consistent with the activity of catalyst employed, and the reaction temperature is particularly important. For example, when using Raney-nickel catalyst which has a high catalytic hydrogenation activity, a reaction temperature of 30°–90° C. is preferred, while, if nickel catalyst supported on kieselguhr is used, a temperature of 100°–150° C. is preferable.

In carrying out the process of this invention, no particular limitation is imposed on the modes of reaction and any method which provides good contacts between the catalyst and the reactant, and between reactants each other, and capable of maintaining predetermined temperature and pressure uniformly may be applicable. For example, in addition to the method used in the examples which will be described hereinafter, a system in which the hydrogenation equipment of the first and second stages are connected in series and the reactants dispersed or dissolved in a suitable dispersing medium or solvent such as γ-butyrolactone and p-dioxane are fed to the abovementioned equipments continuously may also be used.

According to the process as mentioned above, mainly γ-butyrolactone and a considerable amount of succinic anhydride may be obtained from maleic anhydride. Succinic anhydride thus obtained may be converted to γ-butyrolactone in a high yield by using the same catalyst and the same reaction conditons as in the second hydrogenation stage described above.

The present hydrogenation of maleic anhydride using a nickel catalyst leads to the formation of a considerable amount of succinic anhydride or succinic acid as solid products and, as a result, the reaction mixture has a viscous slurry-like appearance.

This means that the yields of the desired γ-butyrolactone and tetrahydrofuran are low, and it is not only undesirable when γ-butyrolactone and tetrahydrofuran are contemplated as the final products but also quite disadvantageous from the standpoint of the operations involved in the transportation of the reaction product, separation of catalyst from the reaction product, reuse of catalyst, etc.

In the catalytic hydrogenation of dicarboxylic acid anhydride and cyclic lactones wherein water and lower organic acids such as propionic, butyric acids, and the like are by-produced during the reaction or originally existing in the system, the nickel component of the catalyst is fatally poisoned and sometimes the nickel is converted to nickel salts and dissolved into the reactant solution. Thus, the conventional nickel catalyst has a disadvantage in that the catalytic activity is greatly decreased in the course of reaction.

To overcome these disadvantages, we have attempted to obtain a catalyst composition capable of affording the reaction product in a non-viscous liquid form, and having less deactivating tendency in the production of γ-butyrolactone or tetrahydrofuran, and, as a result, we have found out that the combination of nickel and rhenium gives a remarkable synergistic effect in the catalytic activity.

It is well known that rhenium catalyst system may be used in the catalytic hydrogenation of various organic acids, for example, as described in Journal of the American Chemical Society, 76 1519 (1954); the Journal of Organic Chemistry, 24, 1847 (1959), 27 4400, 4402, (962), 28, 2343, 2345, 2347 (1963) written by H. S. Broadbent et al.

However, in these literatures, no description is found as to the use of rhenium catalyst in the hydrogenation of dicarboxylic acid anhydrides tó obtain γ-butyrolactone and tetrahydrofuran, and only the catalytic hydrogenation of maleic acid to obtain succinic acid, and the hydrogenation of succinic acid to obtain tetrahydrofuran, butanediol and n-butanol are reported therein. As can be noted from the examples described hereinafter, if the reaction is carried out without using solvent, the hydrogenation of maleic anhydride does not proceed in the presence of rhenium heptoxide alone.

According to another aspect of this invention, there is provided a process for the production of hydrogenated products of maleic anhydride, mainly γ-butyrolactone and tetrahydrofuran which comprises subjecting maleic anhydride to a hydrogenation reaction in the presence of a catalyst composition consisting of nickel and rhenium or rhenium compound.

As noted above, the process is characterized in that the catalytic hydrogenation reaction is effected in the coexistence of rhenium or rhenium compound, hereinafter referred to as rhenium component, with nickel catalyst.

Rhenium component which may be used in the process of this invention include elementary rhenium such as rhenium black which may be obtained by reducing rhenium compounds such as oxides, halides, oxhalides, or sulfates in a suitable manner prior to or in the course of the reaction.

As rhenium compounds which may be used in the process of this invention, rhenium oxides are particularly preferred from the standpoints of maintaining the activity of the co-working nickel catalyst, and prevention of undue corrosion of the reactor and contamination of the product. Although rhenium heptoxide is most commonly used, other lower oxides may also be used as well. When rhenium heptoxide is used, it is well presumed that all or a part of said heptoxide is reduced in the course of hydrogenation reaction to the lower oxides or even to elementary rhenium. Further, if it is used in the form of an aqueous solution as in the examples described hereinafter, rhenium may sometimes take hydrated form or other forms such as perrhenate in the reaction system.

These rhenium components may be used in the process of this invention in the form of solid catalyst prepared by contacting nickel catalyst intimately therewith beforehand.

The nickel catalysts which may be combined with rhenium component include, for example, simple or pure nickel such as Raney-nickel; nickel supported on a carrier such as kieselguhr, alumina, pumice and the like; and nickel alloys consisting of a major portion of nickel such as nickel-chromium alloy, nickel-zinc alloy and the like.

While the nickel-rhenium catalyst composition can be prepared in various ways, it is preferable to prepare the same in the supported form on a carrier as described in the following:

The process for the preparation of the catalyst composition supported on a carrier comprises combining a nickel compound which may be decomposed to metallic nickel by heating in a reducing atmosphere with a rhenium compound which may be decomposed to metallic rhenium by heating in a reducing atmosphere intimately together on a carrier, and heating the resulting combined material in a reducing atmosphere until a solid solution of nickel and rhenium is formed by a thermal decomposition of said compounds.

Although the process mentioned above may be carried out in different ways, in order to accomplish the intimate combination of said compounds, a means involving an impregnation process is preferable. In other words, it is desirable that the compounds per se, or precursor and derivatives thereof which are to be combined together are introduced onto a carrier in the form of a solution, particularly an aqueous solution. In this case, the respective solutions of said nickel compound and rhenium compound, or a mixture of these, may be used to impregnate a carrier, or, these nickel and rhenium compounds may be precipitated on a carrier from solutions thereof by a precipitating agent. Alternatively, either one of these compounds may be firstly precipitated on a carrier which is then impregnated with the solution of other compound.

Among these methods as described above, the last method is particularly preferable. According to the above mentioned process, a catalyst composition of this invention is prepared by kneading an aqueous nickel salt solution and a carrier well, said nickel salt being preferably water soluble and thermally decomposable, for example, nickel nitrate and nickel formate, and said carrier being preferably a porous material including kieselguhr, which is particularly suitable, silica gel, alumina, silica-alumina and the like which may usually be used as a carrier for catalyst; adding to the resulting mixture an aqueous solution containing precipitating agent such as ammonia carbonate, sodium carbonate, sodium bicarbonate and the like which insolubilizes said water soluble nickel salt, and depositing the precipitate of nickel component on a carrier. The resulting mixture is further kneaded with an aqueous solution of rhenium compound which also has water soluble and thermally decomposable properties such as, preferably rhenium heptoxide, and dried at a temperature of about 100° to about 130° C. After being completely dried, the product is reduced in a hydrogen stream. However, if vaporizable rhenium heptoxide is used, it is desirable that the product may be subjected to a preliminary reduction treatment in a hydrogen stream at a temperature of about 200° C. to about 250° C. for about 2–3 hours so that the rhenium heptoxide may be converted to lower oxides. After such pretreatment as described above, the product containing nickel compound and rhenium compound is reduced in a hydrogen stream at a temperature of 350° to 500° C. and most preferably 400° to 450° C., for 2–4 hours to give a catalyst composition of this invention.

It is noted that at a lower temperature e.g. about 350° C. a prolonged reducing period e.g. 10–20 hours, is required. On the other hand, at a higher temperature e.g. about 500° C., the activity of the product catalyst tends to decrease due to the sintering of catalyst granules.

The catalyst composition of this invention may be formed into a desirable shape by adding a suitable binder at any stages in the course of preparation, if necessary.

The catalyst composition thus prepared is, like other reduced nickel catalyst, spontaneously combustible upon contacting with air, however, the ordinary means for stabilizing the conventional nickel catalyst as by treatments with carbon dioxide-diluted air or an inert gas, may also be applicable to the catalyst composition of this invention as well.

It has been confirmed by the X-rays diffraction that nickel and rhenium in the nickel catalyst prepared as above are in the form of solid solution from the facts that the diffraction lattice distance obtained from the diffraction lines of the plane (111) of nickel as shown in Table 1 increases as the rhenium content increases, and that the diffraction strength on the plane (111) of nickel as illustrated in the accompanying drawings are varied as the rhenium content increases.

Alternatively, these rhenium components may also be charged to the reaction system separately from nickel catalyst. For example, the rhenium compound may be charged to the reactor as it is, or in the form of a solution or a dispersion, separately from nickel catalyst, and by so doing the preliminary preparation of nickel-rhenium catalyst composition may be eliminated or the treating of rhenium compound to obtain rhenium black becomes unnecessary as well.

With regard to the rhenium content in the catalyst composition of this invention, no particular restriction is necessarily imposed. Although an increased rhenium content enhances the catalytic activity and may advance the reaction excessively under reaction conditions involving a high temperature and an increased pressure with resulting in non-recovery of the contemplated product, it is still possible to obtain the contemplated product in a good yield by using such a catalyst having a high rhenium content, if a rather mild reaction conditions are employed.

Nevertheless, the less rhenium content is more desirable from the economical point of view since rhenium is expensive comparing to nickel, thus, rhenium content to nickel in atomic ratio of less than 0.2, and particularly ficult.

As can be noted from the example described hereinafter, the decrease in catalytic activity of nickel-rhenium catalyst system is usually minimal, therefore, the catalyst may be reused.

In general, the process of this invention may be carried out under reaction conditions including a temperature of 30°–350° C., and a pressure of 30–300 kg./cm$^2$, however, in order to practise the process of this invention advantageously, it is advisable to divide the process into two stages i.e. a first stage which involves relatively mild reaction conditions and a second stage wherein the intermediate hydrogenated product obtained from the first stage is subjected to the more severe hydrogenation conditions. By so doing, the formation of pitch-like material which usually occurs when the starting maleic anhydride is subjected to a severe hydrogenation condition can be reduced and, as a result, the utilization efficiency of maleic anhydride may be greatly improved.

In the first stage of the process of this invention, the reaction conditions including a temperature of 30°–150° C., a pressure range of 30–100 kg./cm$^2$ and a reaction period of 20 minutes to one hour are perferable. In the second stage of the process of this invention, the reaction conditions including a temperature of 180°–350° C., a pressure of 100–300 kg./cm.$^2$, and a reaction period of 2 to 15 hours are preferred.

These two different reaction conditions as described above may be applied to the reactants in one reactor, or may be applied separately by means of connecting two reactors which are regulated at each respective conditions in series so that the reactant dissolved in a solvent or dispersed in a dispersing agent such as γ-butyrolactone, p-dioxane and the like may be subjected to these reaction conditions while passing therethrough.

Gamma-butyrolactone intended in the process of this invention is not only useful as a solvent but also it has a great importance and utilities as a intermediate in the production of many useful chemical products such as methionine, tetrahydrofuran, pyrrolidone etc.

The following examples will illustrate this.

The Examples 1–4 described hereinafter illustrate the catalytic hydrogenation of maleic anhydride in the presence of nickel catalyst according to this invention.

The yields referred to in these examples are based on the results of gas chromatographic analysis.

EXAMPLE 1

To a 300 ml. autoclave provided with an electromagnetic stirrer, there were charged 100 g. of maleic anhydride, 10 g. of nickel supported on kieselguhr containing 50% by weight of nickel. The reaction mixture was hydrogenated at 150° C. under a pressure of 100 kg./cm.$^2$ for one hour, and then, further hydrogenated at a raised temperature of 250° C. and under an increased pressure of 120 kg./cm.$^2$ for another 3 hours.

As a result, 45.3 g. of γ-butyrolactone, 1.0 g. of tetrahydrofuran, 0.1 g. of n-propanol, 0.1 g. of n-butanol, 1.8 g. of propionic acid, 1.1 g. of butyric acid, about 20.0 g. of succinic anhydride and about 13.0 g. of succinic acid were obtained.

EXAMPLE 2

The catalytic hydrogenation of maleic anhydride was repeated by using the same autoclave and the same amount of catalyst as in Example 1, and 100 g. of maleic anhydride were hydrogenated at 150° C. and under a pressure of 100 kg./cm.$^2$ for one hour. The reaction was further carried on at a raised temperature of 280° C. and under an increased pressure of 150 kg./cm.$^2$ for another 3 hours. As a result, 51.8 g. of γ-butyrolactone, 3.0 g. of tetrahydrofuran, 0.1 g. of n-propanol, 0.1 g. of butanol, 1.8 g. of propionic acid, 2.6 g. of butyric acid, about 17 g. of succinic anhydride and about 6 g. of succinic acid were obtained.

EXAMPLE 3

The catalytic hydrogenation of maleic anhydride was repeated by using the same autoclave and the same amount of catalyst as in Example 1, and 100 g. of maleic anhydride were hydrogenated at 140° C. and under a pressure of 100 kg./cm.$^2$ for half an hour. The reaction was further carried on at a raised temperature of 280° C. and under an increased pressure of 150 kg./cm.$^2$ for another 3 hours.

As a result, 52.5 g. of γ-butyrolactone, 1.1 g. of tetrahydrofuran, 2.1 g. of propionic acid, 2.8 g. of butyric acid, about 14 g. of succinic anhydride and about 2 g. of succinic acid were obtained.

EXAMPLE 4

The catalytic hydrogenation of maleic anhydride was repeated by using the same autoclave and the same amount of catalyst as in Example 1, and 100 g. of maleic anhydride were hydrogenated at 150° C. and under a pressure of 100 kg./cm.$^2$ for an hour. The reaction was further carried on at a raised temperature of 280° C. and under an increased pressure of 150 kg./cm.$^2$ for another 6 hours.

As a result, 55.4 g. of γ-butyrolactone, 2.2 g. of tetrahydrofuran, 0.2 g. of n-butanol, 3.2 g. of propionic acid, 8.5 g. of butyric acid, about 12 g. of succinic anhydride and about 5 g. of succinic acid were obtained.

The Examples 5-7 described hereinafter show the conventional catalytic hydrogenation of maleic anhydride for comparison.

EXAMPLE 5

25 g. of maleic anhydride were hydrogenated in the presence of 2.5 g. of the same catalyst as used in Example 1 at a reaction temperature of 180° C. and under a reaction pressure of 120 kg./cm.$^2$ for 6 hours in a 100 ml. autoclave provided with an electromagnetic stirrer.

As a result, 7.4 g. of γ-butyrolactone, 0.1 g. of tetrahydrofuran, 0.4 g. of propionic acid and 0.1 g. of butyric acid were obtained.

EXAMPLE 6

25 g. of maleic anhydride hydrogenated by using the same autoclave and the same type and amount of catalyst as used in Example 5 at a reaction temperature of 250° C. and under a reaction pressure of 120 kg./cm.$^2$ for 4 hours.

As a result, 8.6 g. of γ-butyrolactone, 1.1 g. of propionic acid and 0.5 g. of butyric acid were obtained.

EXAMPLE 7

25 g. of maleic anhydride were hydrogentated by using the same autoclave and catalyst as in Example 5 at a reaction temperature of 300° C. and under a reaction pressure of 120 kg./cm.$^2$ for 3 hours.

As a result, only 1.2 g. of γ-butyrolactone, 1.4 g. of propionic acid and 0.8 g. of butyric acid were obtained and the remainings were totally pitch-like products.

In any of these Example 5-7 as shown above, the products were so highly viscous that the handling was difficult.

The following Examples 8 and 9 illustrate the reactions in which succinic anhydrides are reduced in the presence of nickel catalysts to produce γ-butyrolactone and tetrahydrofuran according to the present invention.

EXAMPLE 8

25 g. of succinic anhydride were hydrogenated in the presence of 2.5 g. nickel catalyst supported on kieselguhr containing 50% by weight of nickel, at a reaction temperature of 250° C. and under a reaction pressure of 120 kg./cm.$^2$ for 4 hours in a 100 ml. autoclave provided with an electromagnetic stirrer. As as result, 11.8 g. of γ-butyrolactone, 0.1 g. of tetrahydrofuran, and 0.1 g. of propionic acid were obtained.

EXAMPLE 9

25 g. of succinic anhydride were hydrogenated by using the same autoclave and catalyst as in Example 8 at a reaction temperature of 300° C. and under a reaction pressure of 120 kg./cm.$^2$ for 3 hours. As a result, 16.2 g. of γ-butyrolactone and 0.5 g. of tetrahydrofuran were obtained. The yields of lower alcohols such as n-propanol, n-butanol and the like, and lower organic acids such as propionic acid, butyric acid and the like were all less than 0.05 g. and the formation of any pitch-like product was not observed.

The following Examples 10-18 illustrate the hydrogenation of maleic anhydride in the presence of nickel-rhenium catalyst according to this invention.

EXAMPLE 10

To a 300 ml. autoclave provided with an electromagnetic stirrer were charged 98 g. (one mol) of maleic anhydride, 10 g. of nickel supported on kieselguhr containing 50% by weight of nickel, and further 0 g., 0.0025 g., 0.005 g., 0.02 g. and 0.05 g. of yellow rhenium heptoxide in the form of an aqueous solution prepared by dissolving 1 g. of rhenium heptoxide into 1 cc. of water, respectively.

The reaction mixtures were hydrogenated at 150% C. under a pressure of 50 kg./cm.$^2$ for half an hour, and then, further hydrogenated at a raised temperature of 280° C. under an increased pressure of 150 kg./cm.$^2$ for another 3 hours. After the completion of the reactions, the catalyst was removed from the reaction products which were subjected to the gas chromatographic analysis by using methylisobutylketone as a reference and obtained the results as shown in the following Table 1;

TABLE 1

| Experiment No. | Amount of rhenium heptoxide added (g.) | Yields of reaction products (mol) | | | | | |
|---|---|---|---|---|---|---|---|
| | | γ-Butyrolactone | Tetrahydrofuran | n-Propanol | n-Butanol | Propionic acid | Butyric acid |
| 1 | 0 | 0.640 | 0.017 | Trace | 0.001 | 0.031 | 0.034 |
| 2 | 0.0025 | 0.690 | 0.019 | 0.002 | 0.001 | 0.052 | 0.038 |
| 3 | 0.005 | 0.720 | 0.026 | 0.003 | 0.001 | 0.054 | 0.029 |
| 4 | 0.02 | 0.753 | 0.059 | 0.005 | 0.002 | 0.054 | 0.021 |
| 5 | 0.05 | 0.726 | 0.165 | 0.015 | 0.005 | 0.060 | 0.018 |

NOTE.—Above table does not show the yields of succinic anhydride and succinic acid.

EXAMPLE 11

The Experiment No. 5 in Example 10 was repeated under the same conditions as in Example 10 except that the reaction period in the second stage was prolonged to 6 hours from 3 hours.

As a result, 0.520 mol of γ-butyrolactone, 0.229 mol of tetrahydrofuran, 0.036 mol of n-propanol, 0.014 mol of n-butanol, 0.070 mol of propionic acid and 0.040 mol of butyric acid were obtained.

EXAMPLE 12

One mol of maleic anhydride was brought into contact with hydrogen in the presence of 10 g. of nickel catalyst supported on kieselguhr and 0.05 g. of rhenium heptoxide by using the same autoclave as used in Example 10, at 150° C. and under a pressure of 50 kg./cm.² for half an hour, and then, further hydrogenated at a raised temperature of 300° C. and under an increased pressure of 120 kg./cm.² for another 2 hours.

As a result, 0.670 mol of γ-butyrolactone, 0.112 mol of tetrahydrofuran, 0.012 mol of n-propanol, 0.005 mol of n-butanol, 0.103 mol of propionic acid and 0.022 mol of butyric acid were obtained.

EXAMPLE 13

One mol of maleic anhydride was brought into contact with hydrogen in the presence of 10 g. of nickel catalyst supported on keiselguhr and 0.05 g. of rhenium heptoxide by using the same autoclave as used in Example 10, at 150° C. and under a pressure of 50 kg./cm.² for half an hour, and then, further hydrogenated at a raised temperature of 280° C. and under an increased pressure of 130 kg./cm.² for another 3 hours. The catalyst was separated by centrifuge and, as a result, 0.682 mol of γ-butyrolactone, 0.111 mol of tetrahydrofuran, 0.019 mol of n-propanol, 0.004 mol of n-butanol, 0.020 mol of propionic acid and a trace of butyric acid were obtained.

EXAMPLE 14

To the catalyst separated from the reaction in Example 13 were replenished 1 g. of nickel catalyst supported on kieselguhr and 0.005 g. of rhenium heptoxide and the reaction was reported under the same conditions as in Example 10.

As a result, 0.810 mol of γ-butyrolactone, 0.049 mol of tetrahydrofuran, 0.009 mol of n-propanol, 0.013 mol of n-butanol, 0.043 mol of propionic acid and 0.012 mol of butyric acid were obtained.

EXAMPLE 15

One mol of maleic anhydride was brought into contact with hydrogen in the presence of 10 g. of nickel catalyst supported on kieselghur and 0.05 g. of rhenium heptoxide by using the same autoclave as used in Example 10, at 130° C. and under a pressure of 80 kg./cm.² for half an hour, and then, further hydrogenated at a raised temperature of 260° C. and under an increased pressure of 140 kg./cm.² for another 15 hours.

As a result, 0.434 mol of γ-butyrolactone, 0.348 mol of tetrahydrofuran, 0.052 mol of n-propanol, 0.015 mol of n-butanol, 0.035 mol of propionic acid and 0.039 mol of butyric acid were obtained.

EXAMPLES 16–18

In Example 16, one mol of maleic anhydride was brought into contact with hydrogen in the presence of 5 g. of Raney-nickel and 0.05 g. of rhenium heptoxide by using the same autoclave as in Example 10, at 110° C. and under a pressure of 50 kg./cm.² for half an hour, and then, further hydrogenated at a raised temperature of 250° C. and under an increased pressure of 130 kg./cm.² for another 3 hours.

In Example 17, the autoclave used in Example 16 was washed well, and the reaction was repeated under the same conditions as in Example 16 except that no rhenium heptoxide was used.

In Example 18, the autoclave used in Example 17 was washed well again and the reaction was repeated.

The results of these experiments are shown in the following Table 2:

TABLE 2

| Example No. | Yields of reaction products (mol) | | | | | |
|---|---|---|---|---|---|---|
| | γ-Butyro-lactone | Tetrahy-drofuran | n-Propanol | n-Butanol | Propionic acid | Butyric acid |
| 16 | 0.546 | 0.356 | 0.017 | 0.012 | 0.018 | Trace |
| 17 | 0.447 | 0.163 | 0.003 | 0.006 | Trace | Trace |
| 18 | 0.401 | 0.105 | 0.002 | 0.001 | Trace | Trace |

The following Examples 19 and 20 illustrate the hydrogenation of maleic anhydride in the presence of rhenium compound alone:

EXAMPLE 19

One mol of maleic anhydride and 0.05 g. of rhenium heptoxide were charged to the same autoclave as used in Example 10 and the reaction was effected under the same conditions as in Example 10.

As a result, the hydrogen absorption was hardly observed and the reaction product was a pitch-like material.

EXAMPLE 20

One mol of maleic anhydride and 0.3 g. of rhenium heptoxide were charged to the same autoclave as used in Example 10 and the reaction was effected at 150° C. under a pressure of 50 kg./cm.² for half an hour, and then, further reacted at a raised temperature of 280° C. and under an increased pressure of 150 kg./cm.².

As a result, the stirring of the reaction mixture became impossible in about half an hour after the starting of the reaction of second stage mentioned above, and the product was a pitch-like material.

The following Examples 21–24 illustrate the preparation of nickel-rhenium catalyst composition of this invention and the hydrogenation of maleic anhydride in the presence thereof:

EXAMPLE 21

To 500 g. of nickel nitrate Ni(NO$_3$)$_2$·6H$_2$O dissolved in 400 g. of distilled water were added 100 g. of finely powdered kieselghur and the resulting mixture was kneaded for one hour by a kneader to give slurry-like product of dark-greenish color.

To the slurry-like product, there were added 200 g. of ammonium carbonate (NH$_4$)$_2$CO$_3$ dissolved in 200 g. of distilled water slowly while stirring to give yellowish green precipitate which is then filtered off and the solid was washed with distilled water twice. After washing, the solid was dried at a temperature of 110° to 120° C. for 24 hours to give 273 g. of powdered basic nickel carbonate supported on kieselguhr.

To each 30 g. portions of powdered product thus obtained were added 0 g., 0.10 g., 0.20 g., 0.50 g., 1.0 g., 2.0 g., 3.0 g., and 0.5 g. of rhenium heptoxide in the form of an aqueous solution, respectively, and the resulting mixtures were kneaded and dried at a temperature of 110° to 120° for 12 hours.

These catalyst samples prepared as above were orderly numbered from No. 1 to No. 8 in accordance with the amounts of rhenium heptoxide added.

The Samples 2–8 were reduced in a hydrogen stream at a temperature of 200° to 250° for 2 hours and then further reduced at a raised temperature of 450° C. for another 3 hours.

The sample 1 which contains nickel alone was reduced only at 450° C. for 3 hours.

The velocity of the reducing hydrogen stream was varied within a range of 2–10 l./hr. so as to maintain a constant temperature during the exothermic reduction reaction.

The catalysts thus reduced were cooled to as low as 150° C. and the hydrogen stream was changed to carbon dioxide stream and allowed to stand overnight. The velocity of carbon dioxide stream was 2 l./hr., and after the treatment with carbon dioxide, the catalysts were contacted with carbon dioxide-diluted air gradually.

The analysis values of nickel component in these catalysts prepared as above were 40% by weight and the weight of sample 1 after the reducing treatment was 20 g.

One mol (98 g.) of maleic anhydride was brought into contact with hydrogen in the presence of each portion of 5 g. of these sample catalysts Nos. 1–8, respectively, at a reaction temperature of 150° C., and under a reaction pressue of 50 kg./cm.$^2$ for half an hour, and then, further hydrogenated at a raised temperature of 250° C. and under an increased pressure of 120 kg./cm.$^2$ for another 2 hours in a 300 ml. autoclave provided with an electromagnetic stirrer. The above-mentioned reaction involving the low temperature and pressure may be referred to as a "First stage reaction," and the other involving the high temperature and pressure may be referred to as a "Second stage reaction," respectively, hereinafter.

After the competion of the reactions, the catalyst was removed from the reaction products which were subjected to the gas chromatographic analysis by using methylisobutylketone as a reference and obtained the results as shown in the following Table 3: For reference, the diffraction lattice distance on the plane (111) of nickel obtained by X-ray diffraction are also shown in Table 3.

tetrahydrofuran, 0.015 mol of n-propanol, 0.004 mol of n-butanol and 0.010 mol of propionic acid were obtained.

EXAMPLE 23

The catalytic hydrogenation of maleic anhydride was repeated by using sample catalyst No. 8 under the same conditions as in Example 21 except that the reaction period in the second stage reaction was 1 hour instead of 2 hours.

As a result, 0.495 mol of $\gamma$-butyrolactone, 0.344 mol of tetrahydrofuran, 0.032 mol of n-propanol, 0.012 mol of n-butanol, and 0.010 mol of propionic acid were obtained

EXAMPLE 24

The catalytic hydrogenation of maleic anhydride was repeated by using sample catalyst No. 4 under the same conditions as in Example 21 except that 20 g. of butyric acid was added.

As a result, 0.681 mol of $\gamma$-butyrolactone, 0.095 mol of tetrahydrofuran, 0.010 mol of n-propanol and 0.014 mol of n-butanol were obtained.

The following Example 25 illustrates the reaction in which nickel catalyst and rhenium compound are added to the reactant separately.

TABLE 3

| Catalyst sample No. | Atomic ratio of rhenium-to nickel | Lattice distance on the plane (111) of nickel, A. | Yields of reaction products | | | | |
|---|---|---|---|---|---|---|---|
| | | | $\gamma$-Butyro-lactone | Tetrahy-drofuran | n-Propanol | n-Butanol | Propionic acid |
| 1 | 0 | 2.034 | 0.594 | 0.025 | 0 | 0 | 0.007 |
| 2 | 0.003 | 2.035 | 0.643 | 0.042 | 0 | 0 | 0.019 |
| 3 | 0.006 | 2.036 | 0.677 | 0.084 | 0.002 | 0.001 | 0.017 |
| 4 | 0.015 | 2.041 | 0.713 | 0.114 | 0.007 | 0.002 | 0.030 |
| 5 | 0.03 | 2.051 | 0.644 | 0.207 | 0.020 | 0.006 | 0.040 |
| 6 | 0.06 | 2.054 | 0.560 | 0.291 | 0.021 | 0.008 | 0.007 |
| 7 | 0.09 | | 0.470 | 0.359 | 0.045 | 0.017 | 0.015 |
| 8 | 0.15 | 2.068 | 0.214 | 0.529 | 0.139 | 0.045 | 0.018 |

NOTE.—Above table does not show the yields of succinic anhydride and succinic acid.

The accompanying drawing show the variation in the diffraction strength of plane (111) of nickel by depicting the pattern obtained by an X-ray diffraction. In the drawings, the ordinate shows the diffraction strength and the abscissa shows the diffraction angle. The formation of solid solution in these samples can be noted from the variations in the peaks.

The X-ray diffraction apparatus used in the above measurings was operated under the following conditions:

```
Target _____ copper
X-rays tube voltage _____ kv__ 30
Tube current _____ ma__ 20
D.S _____ deg__ 1
R.S _____ mm__ 0.3
S.S _____ deg__ 1
Ratemeter _____ 16
Multiplier _____ 0.6
Time constant _____ sec__ 1
```

EXAMPLE 22

The catalytic hydrogenation of maleic anhydride was repeated by using sample catalyst No. 2 under the same conditions as in Example 21 except that the reaction period in the second stage reaction was 3 hours instead of 2 hours.

As a result, 0.714 mol of $\gamma$-butyrolactone, 0.188 mol of

EXAMPLE 25

For comparison with Example 24, to one mol of maleic anhydride were added 5 g. of sample catalyst No. 1, 20 g. of butyric acid and 0.1224 g. of rhenium heptoxide.

Hydrogenation was carried out under the same conditions as in Example 24. As a result, 0.551 mol of $\gamma$-butyrolactone, 0.308 mol of tetrahydrofuran, small amounts of butanediol and n-propanol, 0.003 mol of n-butanol, 0.006 mol of propionic acid and 0.166 mol of butyric acid were obtained. The residue consisted of catalyst and crystalline high boiling point products having B.P. of above 230° C.

The following Example 26 illustrates for comparison the hydrogenation of $\gamma$-butyrolactone in the presence of a catalyst containing nickel alone, i.e. containing no rhenium.

EXAMPLE 26

Each portion of one mol of $\gamma$-butyrolactone mixed with 0 g., 4 g., 8 g., and 12 g. of butyric acid respectively were contacted with hydrogen in the presence of 10 g. of nickel catalyst supported on kieselguhr containing 50% by weight of nickel, at a reaction temperature of 180° C. and under a reaction pressure of 100 kg./cm.$^2$ for 4 hours, respectively. These experiments were numbered orderly from 1 to 4 in accordance with the amounts of butyric acid added. The results are shown in the following Table 4:

TABLE 4

| Experiment No. | Amount of butyric acid added (g.) | Yields of reaction products | | | | | |
|---|---|---|---|---|---|---|---|
| | | Tetrahy-drofuran | n-Butanol | n-Propanol | Propionic acid | $\gamma$-Butyro-lactone | Butyric acid |
| 1 | 0 | 0.225 | 0.032 | 0.020 | 0.005 | 0.700 | 0.018 |
| 2 | 4 | 0.166 | 0.031 | 0.022 | 0.003 | 0.736 | 0.051 |
| 3 | 8 | 0.105 | 0.020 | 0.011 | 0.002 | 0.870 | 0.085 |
| 4 | 12 | 0.066 | 0.005 | 0.007 | Trace | 0.920 | 0.140 |

What we claim is:

1. Process for the production of hydrogenated products of succinic anhydride, mainly γ-butyrolactone and tetrahydrofuran which comprises subjecting succinic anhydride to a catalytic hydrogenation under reaction conditions including a temperature of 240°–350° C., a pressure of 100–300 kg./cm.$^2$ and a reaction period of 2–10 hours in the presence of a reduced nickel-rhenium catalyst wherein the atomic ratio of the rhenium to the nickel in said catalyst is less than 0.2.

2. Process according to claim 1 wherein the nickel component of said catalyst is selected from the group consisting of Raney-nickel, nickel supported on a carrier such as kieselguhr, alumina, pumice and the like; and nickel alloys consisting of a major portion of nickel and the rhenium component is selected from the group consisting of rhenium black and rhenium oxides.

3. Process according to claim 1 wherein said catalyst composition is composed of nickel and rhenium in the form of solid solution.

4. Process according to claim 1 wherein said catalyst composition is prepared by intimately mixing a nickel compound which may be decomposed to metallic nickel by heating in a reducing atmosphere with a rhenium compound which may be decomposed to metallic rhenium by heating in a reducing atmosphere applying said mixture to a carrier, and heating the resulting combined material in a reducing atmosphere until a solid solution of nickel and rhenium is formed by a thermal decomposition of said compounds on said carrier.

5. Process for the production of γ-butyrolactone and tetrahydrofuran, which comprises subjecting maleic anhydride to a first-stage catalytic hydrogenation in the presence of a reduced nickel-rhenium catalyst at a temperature of 30°–350° C., a pressure of 30–100 kg./cm.$^2$, and a reaction period of twenty minutes to one hour; and then subjecting the reaction products of the first stage to a further catalytic hydrogenation at a temperature of 180°–350° C., a pressure of 100–300 kg./cm.$^2$ and a reaction period of two to fifteen hours in the presence of a reduced nickel-rhenium catalyst wherein the atomic ratio of the rhenium to the nickel in said catalyst is less than 0.2.

6. Process according to claim 5 wherein said nickel-rhenium catalyst is used in the amount of about 5–10% by weight based on the weight of maleic anhydride.

7. Process according to claim 5 wherein the first stage reaction is carried out at a temperature of 30–90° C. and the nickel component of said catalyst is Raney-nickel.

8. Process according to claim 5 wherein the first stage reaction is carried out at a temperature of 100–150° C. and the catalyst includes nickel supported on kieselguhr.

9. Process according to claim 5 wherein the nickel component is selected from the group consisting of Raney-nickel; nickel supported on a carrier such as kieselguhr, alumina, pumice and the like; and nickel alloys consisting of a major portion of nickel and the rhenium component is selected from the group consisting of rhenium black and rhenium oxides.

10. Process according to claim 5 wherein the two reactions are carried out in the presence of a liquid medium and the second stage reaction is carried out in a separate zone from that of the first stage.

References Cited

UNITED STATES PATENTS

| | | | |
|---|---|---|---|
| 2,772,291 | 11/1956 | McShane et al. | 260—343.6 |
| 2,772,292 | 11/1956 | McShane et al. | 260—343.6 |
| 2,772,293 | 11/1956 | Gilbert et al. | 260—343.6 |
| 2,926,173 | 2/1960 | Patrick et al. | 260—343.6 |
| 3,113,138 | 12/1963 | Franko-Filipasac et al. | 260—343.6 |

OTHER REFERENCES

Broadbent et al., J. Org. Chem. 24, 1847 (1959), 27, 4400, 4402, (1962), 28, 2343, 2345, 2347 (1963).

ALEX MAZEL, Primary Examiner

J. A. NARCAVAGE, Assistant Examiner

U.S. Cl. X.R.

252—472; 260—346.1